Jan. 1, 1935.  F. S. FARLEY ET AL  1,986,769
PANEL CUTTING MACHINERY
Filed Nov. 26, 1930   7 Sheets-Sheet 1
FIG. II.
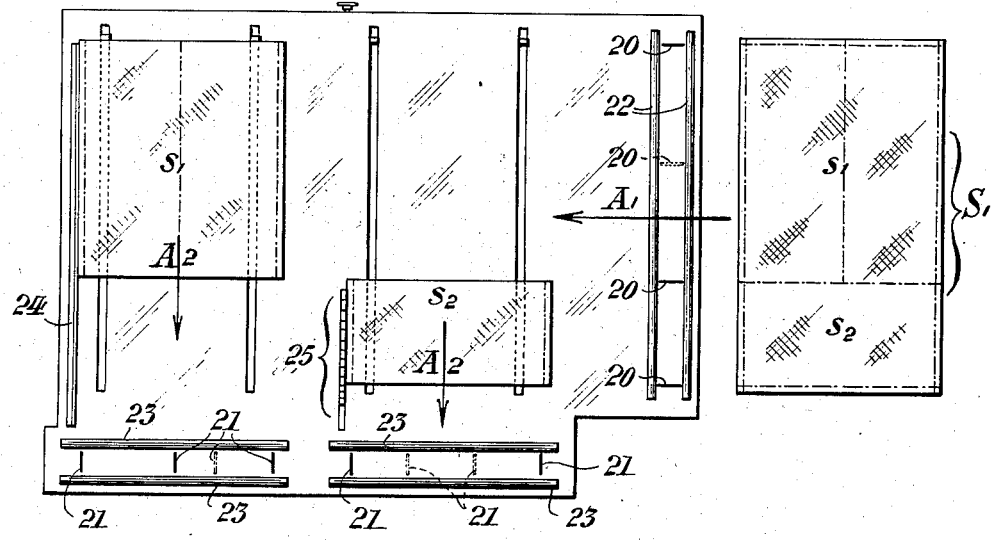
FIG. I.
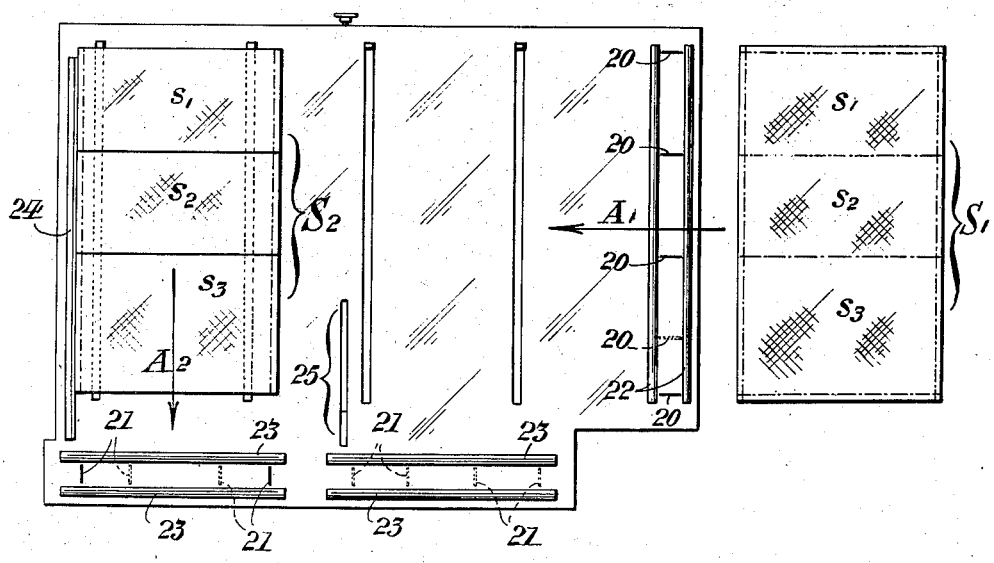
WITNESSES
INVENTORS:
Francis S. Farley &
Lloyd G. Wheeler
BY
ATTORNEYS.

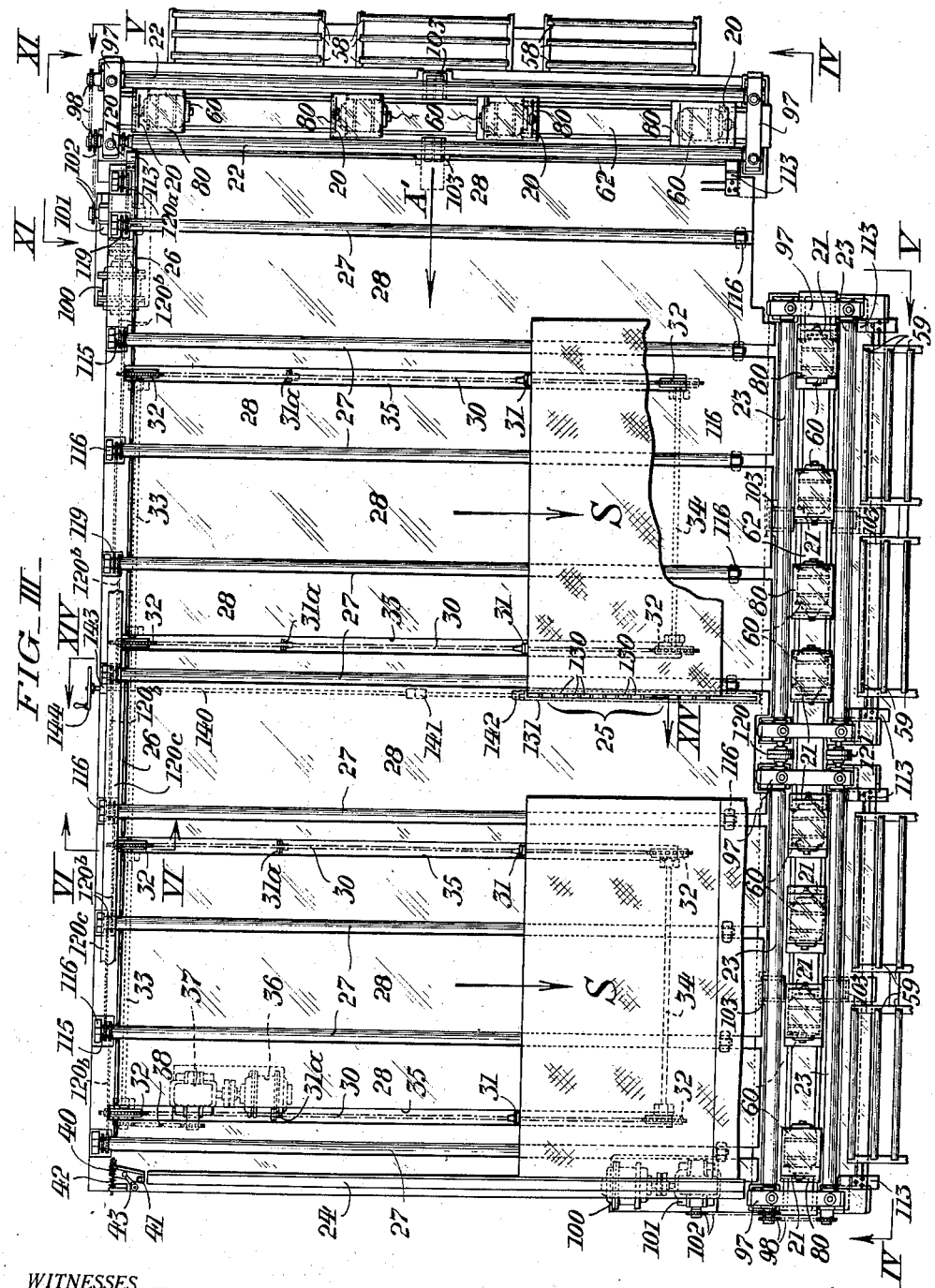

Jan. 1, 1935.   F. S. FARLEY ET AL   1,986,769
PANEL CUTTING MACHINERY
Filed Nov. 26, 1930   7 Sheets-Sheet 3
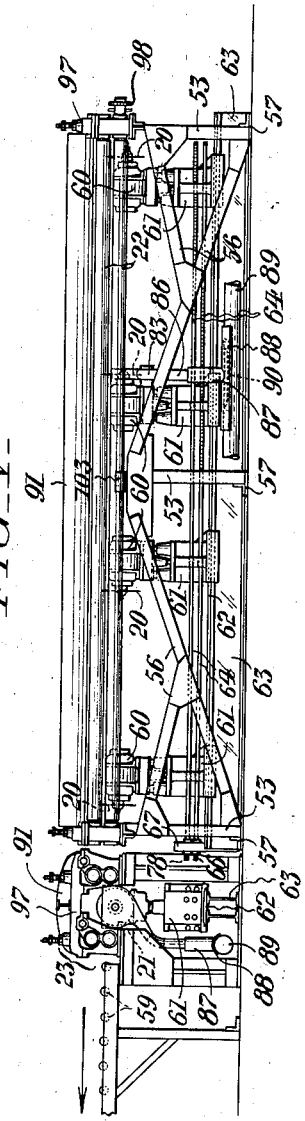
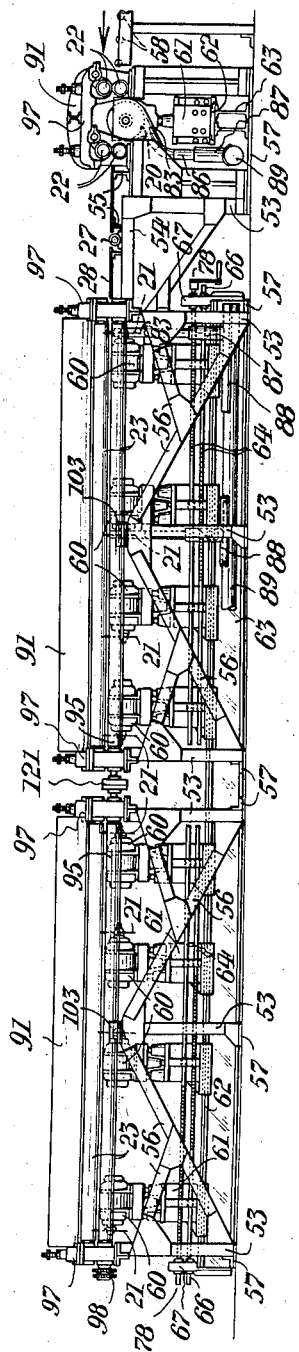
WITNESSES
INVENTORS:
Francis S. Farley &
Lloyd G. Wheeler
BY
ATTORNEYS.

Jan. 1, 1935.  F. S. FARLEY ET AL  1,986,769
PANEL CUTTING MACHINERY
Filed Nov. 26, 1930    7 Sheets-Sheet 4
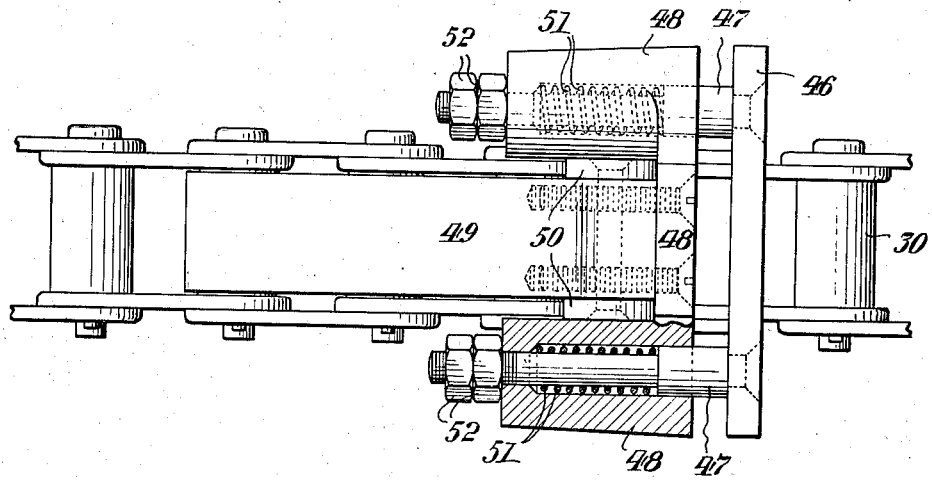
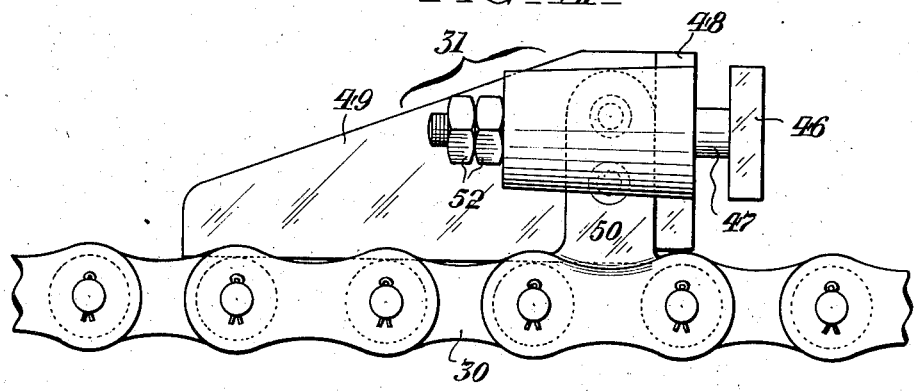
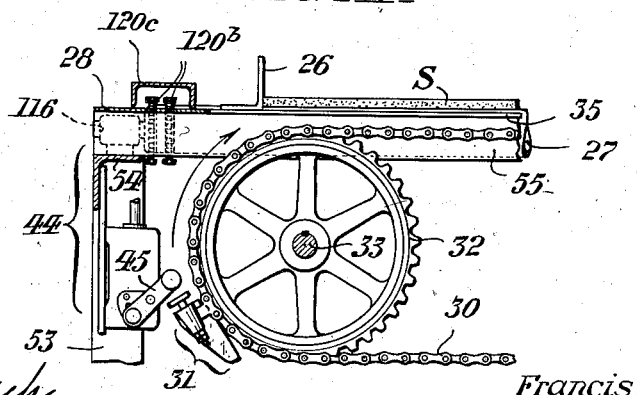

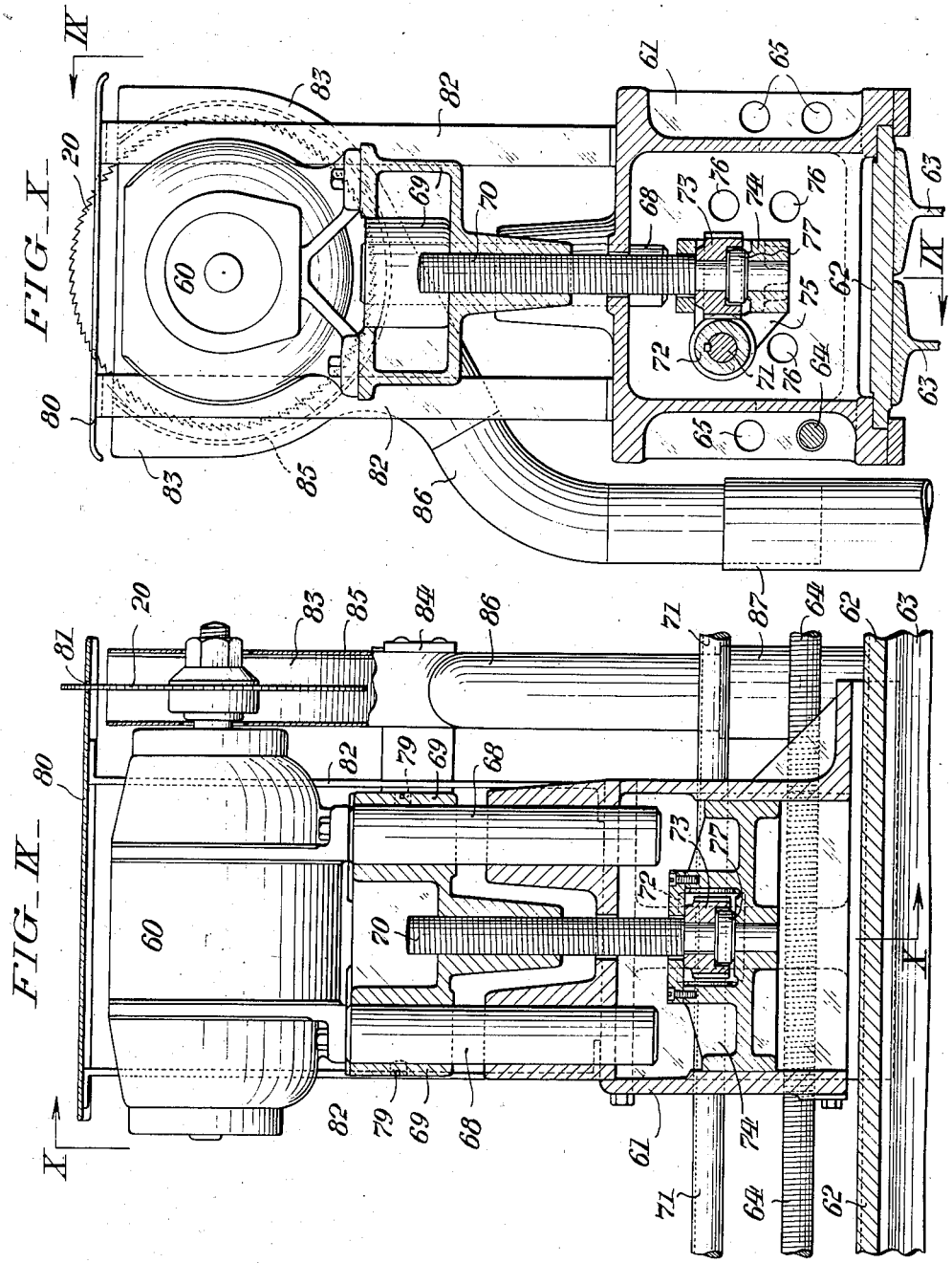

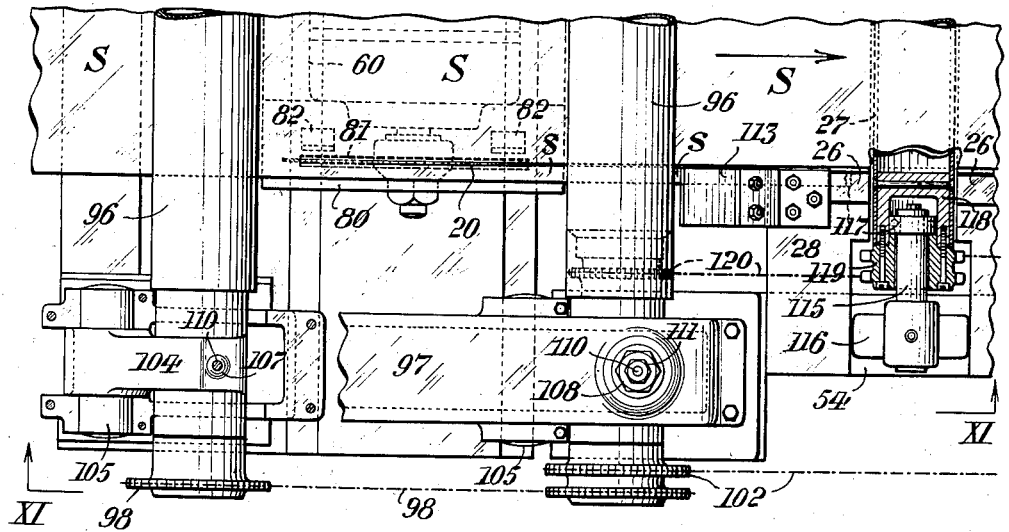
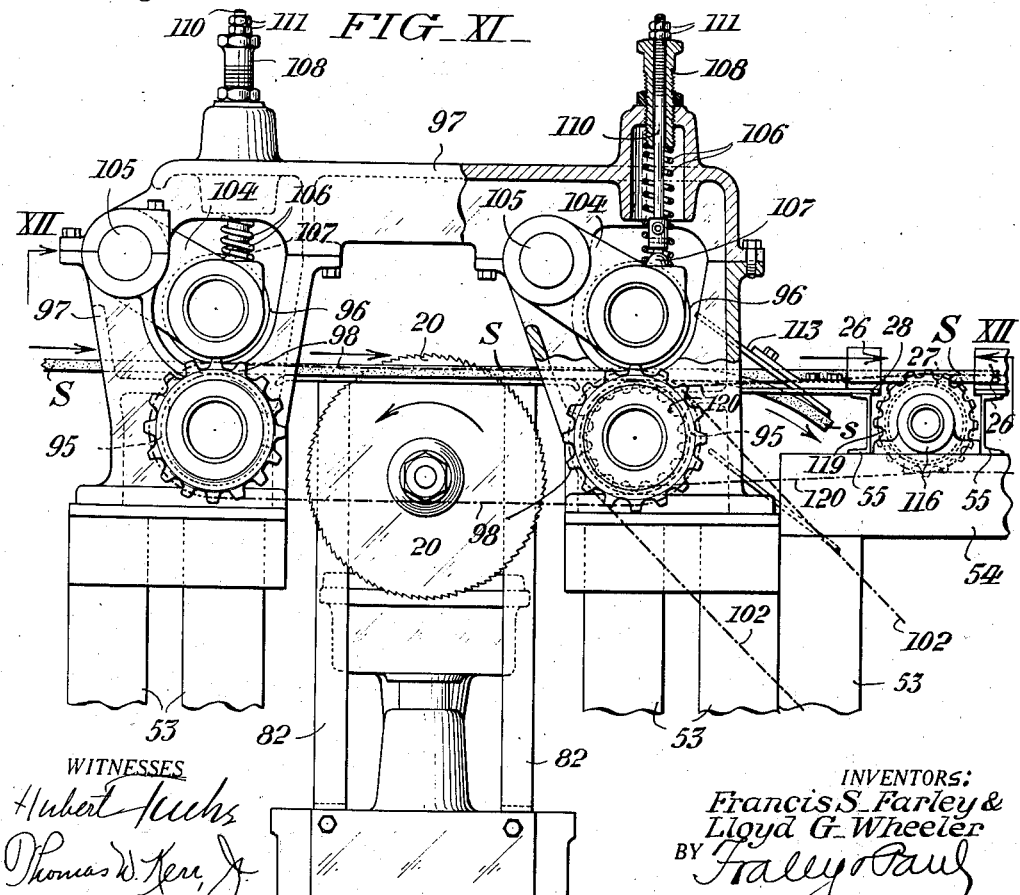

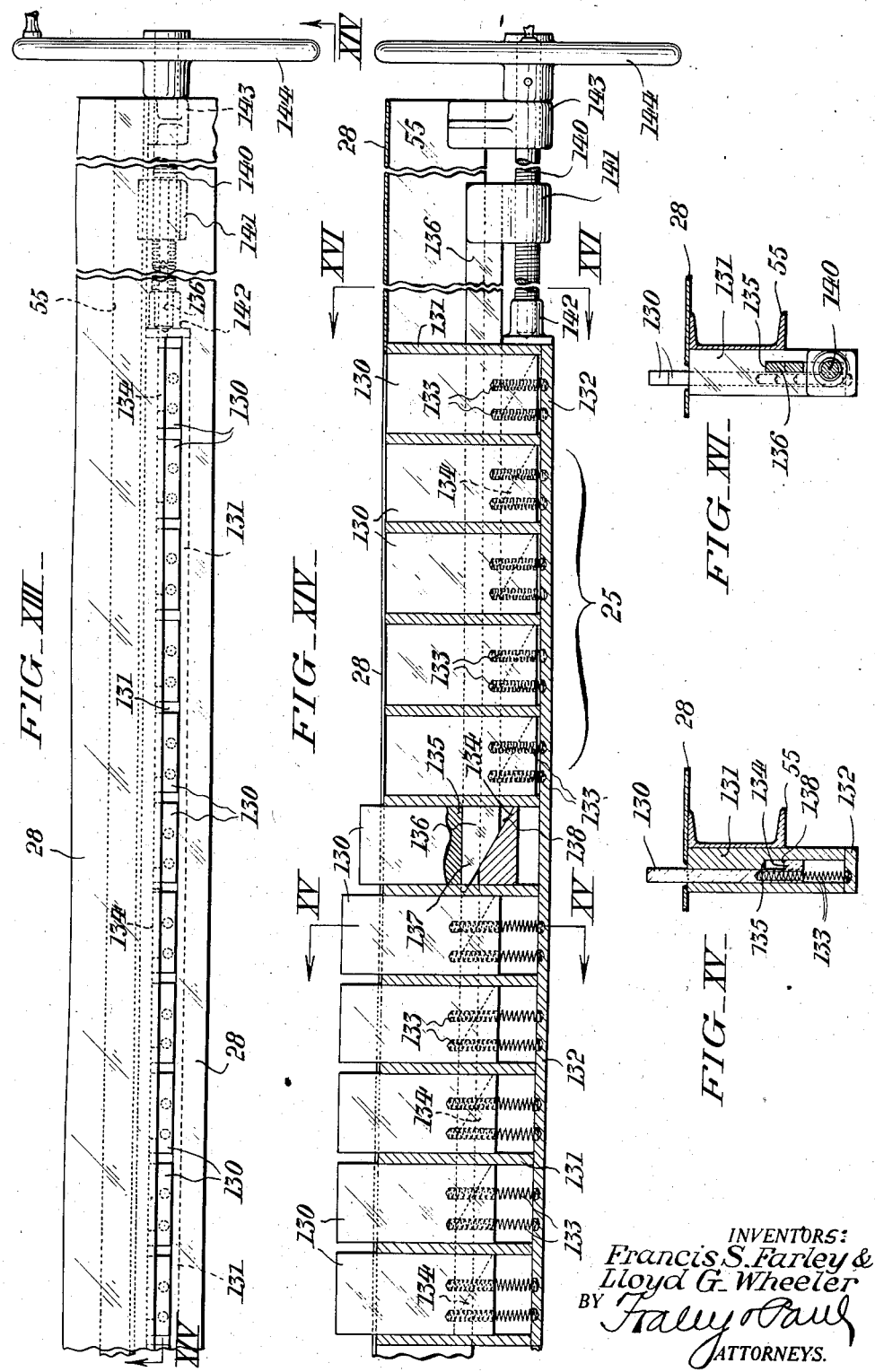

Patented Jan. 1, 1935

1,986,769

UNITED STATES PATENT OFFICE 1,986,769

PANEL CUTTING MACHINERY

Francis S. Farley, Trenton, N. J., and Lloyd G. Wheeler, York, Pa., assignors to B. M. Root Co., York, Pa., a corporation of Pennsylvania Application November 26, 1930, Serial No. 498,364

18 Claims. (Cl. 164—61)

Our invention relates to panel cutting and the like, and is concerned with trimming or cutting up sheet material to desired sizes and shapes. We aim to do this conveniently, rapidly, inexpensively, and with the utmost economy of material. Our invention is adaptable and advantageous for insulation building board, homogeneous hardwood board, paper, wood and fiber pulp board, veneers, and other sheet materials that can be sawed, or cut with grinding wheels. Various advantages that can be realized through the invention will appear from our description hereinafter of a selected and preferred embodiment.

In the drawings, Fig. I is a diagrammatic plan view of a machine suitable for the purposes of our invention, showing a board to be cut approaching the machine, and also showing the parts of a partially cut board in the machine, cuts yet to be made being everywhere indicated by dot-and-dash lines.

Fig. II is a diagrammatic plan view similar to Fig. I, showing the machine set to cut the board somewhat differently.

Fig. III is a plan view of a panel cutting machine conveniently embodying our invention, with certain parts omitted.

Fig. IV is a side elevation of the machine, from the lower or front side of Fig. III.

Fig. V is a side elevation from the right hand side of Fig. III.

Fig. VI is a fragmentary side view, with certain parts in vertical section, illustrating one of the sheet material feeds of the machine and the associated automatic stop mechanism.

Fig. VII is a side elevation of the feed chain shown in Fig. VI, on a larger scale than Fig. VI.

Fig. VIII is a plan view corresponding to Fig. VII, with certain parts in horizontal section.

Fig. IX is a side view of one of the saws with its driving motor and associated parts, on a larger scale than Figs. III, IV and V, with certain parts in vertical section as indicated by the line and arrows IX—IX in Fig. X.

Fig. X is a view similar to Fig. IX, at right angles to that figure, with certain parts in vertical section as indicated by the line and arrows X—X in Fig. IX.

Fig. XI is a side elevation of a portion of the machine from the upper side of Fig. IV, on a larger scale, with certain parts in vertical section, and certain parts omitted to avoid confusion.

Fig. XII is a corresponding plan view, with certain parts in horizontal section, and certain parts omitted.

Fig. XIII is a fragmentary plan view of a portion of the machine, on a larger scale than Fig. III.

Fig. XIV shows a corresponding vertical section, taken as indicated by the line and arrows XIV—XIV in Fig. III.

Fig. XV shows a vertical section taken as indicated by the line and arrows XV—XV in Fig. XIV.

Fig. XVI is a similar sectional view, taken as indicated by the line and arrows XVI—XVI in Fig. XIV.

The machine here shown (Figs. I, II, III, IV and V) comprises a substantially rectangular cutting bed or table for the sheet material S. This table is equipped with sets of rotary cutters 20, 21, adjustable along two adjacent sides of the table, and is also provided with means (hereinafter described) for feeding the sheet material on to and across the table from one of these "cutter sides" toward the opposite side, and then across it, in the table in the other direction and off of it at the other "cutter side". As the material S advances on to the table past the first or entrance set of cutters 20, any desired cuts can be made in this first direction of travel; and as it passes the second or exit set of cutters 21 in leaving the table, any desired cuts can be made in this second direction of travel. In this way, both edges of a sheet S can be trimmed straight, square, and at the desired angle to one another; and the sheet can be divided into any desired number of pieces or panels with straight, square, accurately angled edges,—all by simply setting the cutters 20, 21 according to the cuts required. Preferably, the movement of the sheet material S is definitely controlled during the action of the cutters 20, 21 thereon, as by means of entrance feed devices 22, 22 located closely in front of and behind the entrance cutters 20, and of exit feed devices 23, 23 similarly associated with the exit cutters 21, so as to assure straight cuts.

Provision may be made for limiting the initial (leftwise) travel of the sheet S,—or the portions into which it is cut by the entrance cutters 20,—as by a stop bar 24 at the far side of the table, and also by intermediate stop means corresponding to the initial division of the board, shown as consisting of a removable or depressible stop or fence 25. The employment of such intermediate stop means 25 results in a multiple or parallel exit of the portions into which the board is initially divided, permitting these portions to be differently dealt with at the exit cutters 21, which are arranged in corresponding separate groups. The table may also be provided (Fig. III) with a guide stop 26 along its edge opposite the exit cutters 21.

Fig. I shows a sheet S' approaching the table from the right, and shows four of the cutters 20 set to trim its ends and divide the sheet into three separate portions $s'$, $s^2$, $s^3$,—the cuts being indicated by dot-and-dash lines extending in the direction of movement of the sheet S' represented by the arrow A'. A sheet $S^2$ is also shown already trimmed and divided into the portions $s'$, $s^2$, $s^3$, on the left-hand end of the table, and two cutters 21 are shown set to trim its sides as indicated by the dot-and-dash lines extending in the direction of movement represented by the arrow $A^2$. For this cutting, the stop fence 25 is not required: accordingly, it is shown depressed out of the way in Fig. I, so that all the portion $s'$, $s^2$, $s^3$ leave the table at the left-hand exit and group of cutters 21.

Fig. II is similar to Fig. I, but illustrates a different cutting of the approaching sheet $S'$. Three cutters 20 are shown set to trim its ends and divide it into two portions $S'$ and $S^2$, along the dot-and-dash line in the direction of the arrow $A'$. On the table is shown a sheet already trimmed and cut into the portions $s'$, $s^2$. The portion $s'$ is shown against the stop 24, and the portion $s^2$ against the intermediate stop fence 25, which is shown raised. At the left-hand exit, three cutters 21 are shown set to trim the sides of the portion $s'$ and divide it longitudinally along the dot-and-dash line, in the direction of the arrows $A^2$; and at the right-hand exit two cutters 21 are shown set to trim the ends of the portion $s^2$ in the direction of arrows $A^2$.

In Figs. I and II, cutters 20 and 21 not in use for these particular cuts are indicated by dotted lines, the active cutters being in full lines.

Referring, now, more especially to Figs. III, IV, and V, it will be seen that the means for feeding the sheet material S across the table from the entrance cutters 20 comprises a series of frictional supporting rolls 27, paralleling the entrance rolls 22 at intervals across the table, and revolving counter-clockwise (Fig. III). These rolls 27 need not necessarily constitute the entire table top, but may be supplemented with flat intervening plates 28, a little lower than the tops of the rolls, to sustain thin sheet material between the rolls and assure the front edge of a sheet S riding over each roll properly. The means for feeding the material S across the table to the exit feeds 23 and cutters 21 extends and operates between certain of the rolls 27, consisting of sprocket chains 30 with dogs 31 for engaging the rear edges of the sheet material S and pushing it along. The sprocket chains 30 extend around sprockets 32 on parallel driving and idle shafts 33 and 34, 34, extending beneath the table top parallel with the exit rolls 23; and the dogs 31 project up through the slots 35 in the plates 28. Preferably, there are at least two of the sprocket chains 30 to each portion into which the material S is divided when it leaves the cutters 20, and two pusher dogs 31, 31a to each chain, located half the chain length apart. The upper runs of the chains preferably rest and travel on flat surfaces, while the lower runs are allowed to sag free. The shaft 33 may be driven by an electric motor 36 under the table, through a reducing gearing 37 and a sprocket chain connection 38.

The feed rolls 27 may run all the time, merely slipping under the material S when the latter is against the stops 24, 25, and thereby pressing the material against the stops. However, the feed chains 30 are preferably at rest while the material S is travelling across them in the direction of the arrows $A'$. They may be automatically started and stopped at the proper times, under the control of the movement of the material S, as now described:

As shown in Fig. III, the stop 24 is supplemented with a movable portion or member 40, pivoted to the table at 41, and normally held in the position of Fig. III by a helical compression spring 42, so as to be engaged by the sheet S a little before it reaches the stop 24, and thus pressed back into line with the latter. The member 40 engages the operating arm 43 of a switch mechanism 44 (Fig. VI), which is thus operated to start the motor 36 and the chains 30 as the sheet S reaches its limit of movement. As the chains 30 move, their dogs 31 come up from beneath the table around the sprockets 32, and two of them engage the rear edge of the material S that has been resting against the guide stop 26, and push it across the table to the feed 23 of the exit cutters 21. As the dogs 31 of the other chains 30 advance, they eventually encounter any piece of material S that is lying against the stop 25, and push it along toward the cutters 21. As all the dogs 31 reach the sprockets 32 on the shafts 34, 34, the dog 31a of the left-hand chain 30 (Fig. III) encounters an actuating crank arm 45 of the switch mechanism 44, and thus operates the latter to stop the motor 36,—finally slipping past the arm 45 and coming to rest on the sprocket 32 of shaft 33 a little below the table top.

Preferably, each of the dogs 31, 31a has provisions for cushioning its impact against the edge of a sheet S, so as to minimize the shock of starting the sheet. As shown in Figs. VII and VIII, each dog 31 (or 31a) has a contact bar 46 mounted on shouldered plungers 47 that extend through bores in the "heads" of a part 48 secured to a body 49 that is mounted between the legs of special T-shaped link plates 50, 50, forming part of the sprocket chain 30. Surrounding each plunger 47 in its bore is a helical compression spring 51, acting between the shoulder of the plunger and a corresponding shoulder at the end of the bore. Lock nuts 52 on the ends of the plungers 47 secure them in the part 48.

As here shown (Figs. IV, V, VI, etc.) rolls 27, plates 28, and the associated parts are supported by a framework including uprights 53, horizontals 54, 55, diagonals 56, and foot plates 57, interconnecting the uprights 53. The table may be supplemented or extended to support the approaching sheets S and the leaving panels, as by horizontal roll counters or sets of supply and delivery rolls 58, 59, Figs. III, IV, and V.

The rotary cutters 20, 21 may be abrasive or shearing discs of any suitable type, according to the material to be dealt with, and are here shown as circular saws. They are directly driven by individual electric motors 60 mounted on carriages 61 which are movable on track plates or ways 62 supported by I-beams 63, 63 attached to the foot plates 57 of the machine frame. As the saws 20 and 21 and their associated parts and adjustments are just the same, it will suffice to describe those for the saws 20.

As shown in Figs. IV, V, IX and X, there are a plurality of feed screws or threaded shafts 64 extending along the ways 62, one in threaded engagement with each of the saw carriages 61. Each carriage 61 has openings 65 (Fig. X) large enough to clear the screws 64 of the other carriages,—which need not, of course, be threaded their entire length. The end of each screw 64 is squared at 66, outside of the fixed thrust block 67 in which it is journaled (Fig. IV), to take a crank handle for turning the screw. Each motor 60 with its saw 20 is vertically adjustable relative to its carriage 61, so that any saw may be lowered out of action when not required to cut. As shown in Figs. IX and X, each motor 60 has two vertical guide rods 68 that work in corresponding bores in the carriage 61, and also has a base 69 threaded to take a vertical adjusting screw 70 rotatably mounted on the carriage 61. Each screw 70 is operated by a shaft 71 extending along the ways 62, through a worm 72 slidably splined on the shaft and a worm gear 73 keyed to the screw 70. The shaft 71 and the plain lower end of the screw 70 are journaled in a part 74 extending across the interior of the hollow carriage structure 61; and the worm 72 is engaged between journal lugs 75 on this part 74, at either side of the gear 73. Each carriage 61 has openings 76 large enough to clear the shafts 71 of the other carriages. The screw 70 has a thrust shoulder 77, seated (with gear 73) in an opening in the part 74. The end of each shaft 71 is squared at 78 (Fig. IV) to take a crank handle (not shown) for turning the shaft. As shown in Fig. IX, the motor 60 can be adjusted relative to its base 69 by sliding its rods 68 through the base, and can be secured by set-screws 79.

Above each motor 60 is a horizontal shelf 80, with a clearance slot 81 for the saw 20, mounted on uprights 82 attached to the carriage 61. The shelf 80, therefore, moves horizontally with the carriage 61, motor 60, and saw 20, but does not shift vertically with the motor and the saw. Around the saw 20 is a casing or dust guard 83, mounted on a bracket arm 84 on the motor base 69, and extending close up to the shelf 80 when the saw 20 is in its raised active position (Figs. IX and X). The guard 83 has a detachable side plate 85 whose removal allows the saw 20 to be removed. The guard 83 also has a suction outlet pipe 86 that telescopes with a pipe 87 having a curved shield 88 at its mouth (Fig. V), which shield travels on a suction conduit 89 extending alongside the ways 62. The conduit 89 has elongated openings 90 adapted to overlap the pipe 87 in any position of the latter within the required range of adjustment of each saw 20, and to be covered by the shield 88 at all times. As shown in Figs. IV and V, there is a curved dust shield 91 extending along over each set of saws 20, 21; this is omitted from the other figures of the drawing, for the sake of clearness.

Referring to Figs. III, IV, XI and XII, it will be seen that each of the feed devices 22, 22 associated with the saws 20 comprises a pair of cooperating lower and upper rolls 95, 96, between which the sheet material S passes. The lower rolls 95 are journaled in a hollow yoke structure 97 carried by a plurality of the frame uprights 53. The rolls 95, 95 are interconnected by a chain and sprocket drive 98, and the right hand roll 95 is driven by an electric motor 100 (Fig. III) through reduction gearing 101 and a chain and sprocket connection 102. To minimize deflection of the lower rolls, they are provided with intermediate segmental bearings 103, Figs. III, IV and V. The upper rolls 96, 96 are movably mounted, so as to rest by gravity on the sheet S, and be driven by friction therewith as the sheet passes over the positively driven lower rolls 95, 95. As here shown, each end of each roll 96 is journaled in one end of a short link 104 pivoted in the hollow yoke 97 at 105. A helical compression spring 106 mounted in a chamber in the yoke structure 97 assists gravity in pressing the roll 96 downward upon the material S. Roller bearings for the roll 96 in the link 104 minimize the pressure required to cause the roll to turn by friction with the material. As shown in Fig. XI, the lower end of the spring 106 engages around a rounded protuberance 107 on the link 104, while its upper end engages an abutment screw 108 adjustable in the structure 97. Provision may be made for regulating the normal space between the rolls 95, 96 to be just a little less than the thickness of the board S to be cut, by means of a link rod 110 whose lower end is connected to the link 104 by a universal joint in the protuberance 107, and whose upper end extends through the hollow screw 108 and is threaded to take a pair of adjusting lock-nuts 111. This obviates excessive pressure on thick sheets and allows of adjusting the machine to take sheets ranging from $\frac{1}{16}''$ to 2'' in thickness. As shown in Figs. XI and XII, a sloping deflector 113 is bolted to the table plate 28 just beyond the second pair of rolls 95, 96, to deflect the marginal trim s from the sheet S downward under the table to any convenient point or means of disposal. As shown in Figs. III and XI, the saw 20 at this side of the table is directly in line with the edge of the guide stop 26, so as to engage the truly cut edge of the sheet S as it comes from the saw and guide it across the table. As shown in Fig. III, there is a similar trim deflector 113 for the other side of the sheet S, adjustable by virtue of slots in the table plate 28.

As shown in Figs. III, XI and XII, each end of each (hollow) table roll 27 is mounted on a headed stud 115 which is in turn mounted in a bracket 116 attached to the frame member 54. Ball bearings 117 are provided around the head of the stud 115, in the recess of a hollow member 118 secured in the end of the hollow roll 27. Around the shank of the stud 115 is a double sprocket member 119, secured to said part 118. The first roll 27 is driven from the adjacent lower roll 95 by a chain and sprocket connection 120, including a double idle sprocket 120a, and the rest of the rolls 27 all the way across the table are driven from the first one by a series of simple chain and sprocket connections 120b, as shown in Fig. III. The upper runs of these chain and sprocket connections may be protected by an inverted channel cover 120c, Figs. III and VI.

The parts associated with the exit cutters 21 and their feed devices 23, 23 are substantially the same as for the cutters 20 and feed devices 22, and are marked with the same reference characters, so as to dispense with repetitive description. As shown in Figs. III and IV the lower feed rolls 95, 95 of the two table exits are directly connected together by couplings 121, 121, and thus all driven from a single motor 100.

As shown in Figs. III, XIII, XIV, XV and XVI, the stop fence 25 comprises a series or row of rectangular plates 130 movable up and down in pockets in a guide box 131, with a removable bottom strip 132. Each of the members 130 is yieldingly urged upward by a couple of helical compression springs 133, partly housed in holes in the member 130, and having their lower ends socketed in depressions in the bottom 132. Each member 130 has on one side a stop projection 134 adapted to engage a shoulder 135 to limit the upward movement of the member 130 and its projection above the table top. The members 130 can be depressed, when desired, by a cam bar 136 whose bevelled end 137 co-acts with a bevel 138 on the stop projection 134 of each member 130. This cam bar 136 is longitudinally movable in the guide box 131 above the projections 134, and is operated by a feed screw 140 threaded through a head 141 on the bar 136, and journaled in a bearing 142 at the end of the structure 131 and in a bearing 143 attached to the frame of the machine. The screw 140 may conveniently be operated by a hand wheel 144 on its outer end (Figs. III, XIII and XIV). In practice, the length of stop fence 25 projecting above the table should be made as long as possible without interfering with the necessary freedom of the sheet portion that is not to be stopped to get by.

When the machine is in operation, the cutters 20 and 21 and the feed rolls 22, 23 and 27 run continuously. The rolls 27 do not mark or mar the sheets S, however, even when the sheets are stationary at the stop fence 24 and 25; because in operation the rolls 27 soon clean themselves and acquire a high polish. The like is true of the plates 28 and the saw shelves 80. The sheets S approach over the roll counters or conveyors 58 at spaced intervals, and at a speed slightly less than the surface speed of the entrance feed rolls at 22, so that an incoming sheet can never conflict with a sheet in the machine. For a similar reason, the speed of the feed chains 30 should be slightly less than the surface speed of the exit rolls 23. The sheets are held firmly by the co-operating rolls 95, 96 while being sawed,—most of the time both in front of and behind the saws. The right-hand entrance trim saw 20 (Fig. V) should always be in alignment with the guide stop 26 (Fig. III); whereas the left-hand entrance trim saw can be adjusted as desired,—the trim on this side varying accordingly. In both cases, the trim is separated from the rest of the sheet as it is cut. The dust from the saws 20, 21 is likewise removed at its very source.

The driving of the saws 20, 21 by individual motors 60 not only results in a direct variation of the available motor power with variation in the number of saws in service, and thus gives a better power factor, but also allows of easier access and easier changing of saws, and adjustment of the number in service: i. e., it avoids the complications and labor encountered with a plurality of saws mounted on a common arbor, and the necessity of using split saws. By means of the shafts 64 and 71, the saws 20, 21 can be very conveniently adjusted and controlled, from outside of the machine.

Having thus described our invention, we claim:

1. A machine of the character described, for trimming and cutting up sheet material into panels, comprising a table with sets of rotary cutters adjustable along two adjacent sides of the table and means for feeding a sheet from one of said sides across the table toward its opposite side, thus cutting it into separate portions in this direction of travel, and for feeding one of such portions further than another; and means for subsequently feeding the sheet material across and off of the table over the other of said sides, so that any or all of the portions may be cut in their second direction of travel.

2. A machine of the character described, for trimming and cutting up sheet material into panels, comprising a table with sets of rotary cutters adjustable along two adjacent sides of the table and means for feeding a sheet from one of said sides across the table toward its opposite side, thus cutting it into separate portions in this direction of travel; means for stopping a portion of the sheet part way across the table; and means for feeding the portions across and off of the table at the other of said sides, so that any or all of the portions may be cut in their second direction of travel.

3. A machine of the character described, for trimming and cutting up sheet material into panels, comprising a table with sets of rotary cutters adjustable along two adjacent sides of the table and means for feeding a sheet from one of said sides across the table toward its opposite side, thus cutting it into separate portions in this direction of travel, a stop fence of variable length shiftable above and below the table for stopping a portion of the sheet part way across the table, and means for feeding the portions across and off of the table at the other of said sides, so that any or all of the portions may be cut in their second direction of travel.

4. A machine of the character described, for trimming and cutting up sheet material into panels, comprising a table with sets of rotary cutters adjustable along two adjacent sides of the table and means for feeding a sheet from one of said sides across the table toward its opposite side, thus cutting it into separate portions in this direction of travel; means for stopping a portion of the sheet part way across the table; means for feeding the portions across and off of the table at the other of said sides, so that any or all of the portions may be cut in their second direction of travel; and means actuated by the farthest traveling piece for automatically starting the latter feeding means.

5. A machine of the character described, for trimming and cutting up sheet material into panels, comprising a table with sets of rotary cutters adjustable along two adjacent sides of the table; means for feeding the sheet material, flat, from one of said sides and sets of cutters across the table as far as desired toward its opposite side, substantially regardless of shortness of the material in this direction, and means moving always one way for subsequently feeding the sheet material, flat, across and off of the table over the other of said sides, with a continuous movement and in definite alignment, also substantially regardless of shortness of the material in the direction first mentioned; so that the material may be cut in a definite way in either or both directions of its travel, as it passes on and off of the table.

6. A machine of the character described, for trimming and cutting up sheet material into panels, comprising a table with sets of rotary cutters adjustable along two adjacent sides of the table, means for feeding the material from one of said sides across the table toward its opposite side, means for stopping the material in its travel and aligning it for the second set of cutters, means for feeding the aligned material across the table to the second set of cutters, and means actuated by the material as it reaches said stop means for starting the second-mentioned feeding means.

7. A machine of the character described, for trimming and cutting up sheet material into panels, comprising a table with sets of rotary cutters adjustable along two adjacent sides of the table, means for feeding the material from one of said sides across the table toward its opposite side, means for stopping the material in its travel and aligning it for the second set of cutters, means for feeding the aligned material across the table to the second set of cutters, and means in the normal path of the leading corner of the sheet remote from the second set of cutters, actuated by said corner when the material is stopped and aligned as aforesaid, for starting the second mentioned feeding means.

8. A machine of the character described, for trimming and cutting up sheet material into panels, comprising a table with sets of rotary cutters adjustable along two adjacent sides of the table, and stops along the other two sides; means for feeding the material across the table from one set of cutters, with its edge guided by the stop at the adjacent table side, until arrested by the stop at the opposite table side; means for feeding the thus arrested material across the table to the second set of cutters; and means at the table corner between said stops for starting the second mentioned feeding means, when actuated by the corresponding corner of the material.

9. A machine of the character described, for trimming and cutting up sheet material into panels, comprising a table with sets of rotary cutters adjustable along two adjacent sides of the table and rolls for frictionally feeding a sheet from one of said sides across the table toward its opposite edge, thus cutting it into separate portions in this direction of travel; a set of co-operating feed rolls in front of and behind the second set of cutters for engaging both sides of the sheet material and thus positively controlling it during the action of these cutters on it; sprocket chains extending and operating between the rolls for feeding the material across the table to the initial feed rolls of the second set of cutters; means actuated by the farthest travelling piece for automatically starting the sprocket chains; and means actuated by a sprocket chain for automatically stopping the chains.

10. A machine of the character described, for trimming and cutting up sheet material into panels, comprising a table with sets of rotary cutters adjustable along two adjacent sides of the table, and stops along the other two sides; rolls for frictionally feeding a sheet across the table from one set of cutters, with its edge guided by the stop at the adjacent table side, until arrested by the stop at the opposite table side; and means in the intervals between said rolls for feeding the material across the table to the second set of cutters.

11. A machine of the character described, for trimming and cutting up sheet material into panels, comprising a table with sets of rotary cutters adjustable along two adjacent sides of the table, and stops along the other two sides; rolls for frictionally feeding a sheet across the table from one set of cutters, with its edge guided by the stop at the adjacent table side, so that it may be cut into separate portions in this direction of travel; a stop fence shiftable above and below the table for stopping a portion of the sheet part way across; co-operating feed rolls in front of and behind the second set of cutters for controlling the sheet material during the action of these cutters on it; means for feeding the material across the table to the initial rolls of the second set of cutters; means for starting said last-mentioned feed means actuated by the farthest travelling piece of material when it reaches the stop opposite the first set of cutters; and means for stopping the last mentioned feed means after the sheet material reaches the feed rolls of the second set of cutters.

12. In a machine of the character described, for trimming and cutting up sheet material into panels, the combination with a cutting table of ways along the table; carriages on said ways, with means for adjusting them individually therealong; a saw with a driving motor therefor on each carriage, independently adjustable up and down relative thereto; a shelf over said motor and saw independently mounted on said carriage; a dust flue mounted on said carriage, and a dust guard around said saw having a telescoping connection with said flue and a side wall removable to permit removal of the cutter from its shaft.

13. A machine of the character described, for cutting sheet material, comprising ways and carriages thereon, with means for adjusting them individually therealong; rotary cutters with driving motors therefor on such carriages, independently adjustable up and down relative thereto; dust flues mounted on such carriages; dust guards around said cutters having telescopic connections with said flues and side walls removable to permit removal of the cutters from their shafts; and a dust conduit having a sliding connection with said dust flues.

14. A machine of the character described, for cutting sheet material, comprising ways and carriages thereon, with means for adjusting them indivdually therealong; rotary cutters with driving motors therefor on such carriages, independently adjustable up and down relative thereto; dust flues mounted on such carriages; and dust guards around said cutters having telescopic connections with said flues.

15. A machine of the character described, for cutting sheet material, comprising ways and carriages thereon, with means for adjusting them individually therealong; rotary cutters with driving motors therefor on such carriages, independently adjustable up and down relative thereto; and dust guards around said cutters having side walls removable to permit removal of the cutters from their shafts.

16. A machine of the character described, for cutting sheet material, comprising ways with a plurality of carriages thereon; rotary cutters with driving motors therefor on such carriages, adjustable up and down relative thereto; and means operable from an end of the ways for independently adjusting the several motors and their cutters up and down relative to their carriages, in any positions of the latter.

17. A machine of the character described, for cutting sheet material, comprising ways with a plurality of carriages thereon; rotary cutters with driving motors therefor on such carriages, adjustable up and down relative thereto; means operable from an end of the ways for independently adjusting the several carriages along them; and means operable from an end of the ways for independently adjusting the several motors and their cutters up and down relative to their carriages, in any positions of the latter.

18. A machine of the character described, for cutting sheet material, comprising a cutting table and ways therealong; carriages individually movable along said ways, and provided with guides extending substantially perpendicular to the plane of the sheet material on the cutting table; and rotary cutters with independent individual driving motors therefor on said carriages, independently movable up and down along said guides relative to their respective carriages and to said table.

FRANCIS S. FARLEY.
LLOYD G. WHEELER.